United States Patent [19]

Rittler

[11] 4,438,210

[45] Mar. 20, 1984

[54] TRANSPARENT COLORLESS GLASS-CERAMICS ESPECIALLY SUITABLE FOR USE AS STOVE WINDOWS

[75] Inventor: Hermann L. Rittler, Corning, N.Y.

[73] Assignee: Corning Glass Works, Corning, N.Y.

[21] Appl. No.: 451,283

[22] Filed: Dec. 20, 1982

[51] Int. Cl.$^3$ ............................................... C03C 3/22
[52] U.S. Cl. ............................................ 501/4; 501/7
[58] Field of Search .................................... 501/4, 5, 7

[56] References Cited

U.S. PATENT DOCUMENTS

| | | | |
|---|---|---|---|
| 3,148,994 | 9/1964 | Voss | 501/5 |
| 3,834,981 | 9/1974 | Grossman | 501/5 |
| 3,856,497 | 12/1974 | Hummel | 501/4 |
| 3,970,463 | 7/1976 | Planchock et al. | 501/4 |
| 3,977,886 | 8/1976 | Muller | 501/4 |
| 4,018,612 | 4/1977 | Chyung | 501/4 |
| 4,057,434 | 11/1977 | Rittler | 501/7 |

*Primary Examiner*—Mark Bell

*Attorney, Agent, or Firm*—C. S. Janes, Jr.

[57] ABSTRACT

This invention is directed to transparent, essentially colorless glass-ceramic articles containing $\beta$-quartz solid solution as the predominant crystal phase consisting essentially, expressed in terms of weight percent on the oxide basis, of $SiO_2$—65–75,
$Li_2O$—1–4,
$Al_2O_3$—15–25,
$ZnO$—0.5–2,
$Na_2O$ and/or $K_2O$—0–2,
$TiO_2$—2–6,
$ZrO_2$—0–2,
$BaO$—0–2.5,
F—0–1.2,
$Fe_2O_3$—>0.01–<0.1, Through ion exchange reactions the article can be made highly resistant to attack by the atmospheres in coal and wood burning stoves.

1 Claim, No Drawings

TRANSPARENT COLORLESS GLASS-CERAMICS ESPECIALLY SUITABLE FOR USE AS STOVE WINDOWS

BACKGROUND OF THE INVENTION

U.S. application Ser. No. 451,282, filed concurrently herewith by me under the title *Transparent Glass-Ceramics Especially Suitable for Use as Stove Windows*, provides a brief history of the use of transparent materials as windows in the doors of coal and wood burning stoves. Most commonly, standard soda lime window glass or borosilicate glass has been utilized for that purpose. Both of those products have been subject to cracking as a result of thermal shock and/or deformation and, occasionally, as a result of impacts and other physical abuse. More recently, such stove windows have been fabricated from 96% silica glass. Those glasses are much more refractory than soda lime and borosilicate glasses and have much lower coefficients of thermal expansion. Therefore, they are essentially immune to thermal shock and deformation, but are quite expensive to fabricate and are as equally subject to mechanical breakage as the soda lime and borosilicate glasses.

Most recently, as is explained in Ser. No. 451,282, stove windows have been fashioned from certain transparent glass-ceramics. Such windows have been formed from glass-ceramics having base compositions within the $Li_2O-Al_2O_3-SiO_2$ system nucleated with $TiO_2$ and, optionally, $ZrO_2$ which contain $\beta$-quartz or $\beta$-eucryptite solid solution, as such has been variously termed, as the predominant crystal phase. Because of the crystals present in the glass-ceramics, the articles produced therefrom are inherently mechanically stronger than glass bodies. Moreover, $\beta$-quartz solid solution crystals can exhibit coefficients of thermal expansion over the range 0°–300° C. of 0 or less. Accordingly, a glass-ceramic containing such crystals as the predominant crystal phase will manifest excellent thermal shock resistance. Furthermore, such a glass-ceramic will demonstrate high refractoriness because of the high melting point of the $\beta$-quartz solid solution crystals plus the fact that the residual glass of the glass-ceramic is of an aluminosilicate composition having a high softening point.

Ser. No. 451,282 noted that glass-ceramics containing $\beta$-quartz solid solution as the predominant crystal phase, which are suitable for use as windows for coal and wood burning stoves, had been prepared from compositions encompassed within U.S. Pat. Nos. 3,148,994 and 4,018,612.

The glass-ceramics of U.S. Pat. No. 3,148,994 were prepared by heat treating precursor glass bodies consisting essentially, expressed in terms of weight percent on the oxide basis, of $SiO_2$—65–75
$Li_2O$—1–4
$MgO$—1–4
$Al_2O_3$—15–25
$ZnO$—0.5–2.0
$Na_2O$ and/or $K_2O$—0.1–2.0
$TiO_2$—3–6
$F$—0.1–1.2

The precursor glass bodies are crystallized in situ by heat treating at temperatures between about 750°–850° C. $\beta$-quartz solid solution constitutes the primary crystal phase. A minor amount of rutile crystallization resulting from the presence of $TiO_2$ as a nucleating agent may also be present.

The glass-ceramics of U.S. Pat. No. 4,018,612 were prepared by heat treating precursor glass bodies consisting essentially, expressed in terms of weight percent on the oxide basis, of $SiO_2$—67–70,
$Li_2O$—2.5–3.5,
$MgO$—1.5–2.5,
$Al_2O_3$—17.75–20,
$ZnO$—1–2,
$TiO_2$—2–4.5,
$ZrO_2$—1–2,
$BaO$—0–2.

Alkali metal oxides other than $Li_2O$, alkaline earth metals other than MgO and BaO, and $B_2O_3$ are essentially absent from the compositions. Whereas the compositions of U.S. Pat. No. 3,148,994 only require the presence of $TiO_2$ as the nucleating agent, nucleation of the glasses of U.S. Pat. No. 4,018,612 is provided by a combination of $TiO_2+ZrO_2$. The precursor glass bodies were crystallized in situ by heat treating at temperatures between about 850°–950° C.

Both groups of those glass-ceramics exhibit thermal and mechanical properties strongly recommending their utility as windows for coal and wood burning stoves. Nevertheless, as was observed in Ser. No. 451,282, both groups of products are subject to chemical attack after relatively short term exposure to the atmospheres of such stoves. Thus, the surface of the glass-ceramic becomes roughened and crazing develops therein. Ser. No. 451,282, is directed to means for making the surfaces of those two groups of glass-ceramics highly resistant to such attack.

In the first embodiment of the inventive method, the precursor glass article is first subjected to a $H^+$ ion for $Li^+$ ion exchange reaction utilizing the practice generally described in U.S. Pat. No. 3,834,981, i.e., by immersion into a bath of strong mineral acid at temperatures of about 25°–320° C. to remove $Li^+$ ions from the glass surface to a depth of at least 10 microns and preferably 25 microns. Thereafter, the glass article is crystallized in situ to a glass-ceramic via heat treatment at a temperature proper to the glass composition. The ion exchange must be carried out on the precursor glass article. Crazing occurs when the glass-ceramic article is subjected to the $H^+$ ion for $Li^+$ ion exchange reaction.

In the second embodiment of the inventive method, the precursor glass article is first crystallized in situ to a glass-ceramic by heat treating at a temperature proper to the glass composition. Subsequently, the glass-ceramic article is subjected to a $K^+$ ion for $Li^+$ ion exchange reaction by contact with a source of $K^+$ ions (normally a bath of a molten potassium salt) at temperatures between about 400°–800° C. for a sufficient length of time to cause the replacement of $Li^+$ ions in the $\beta$-quartz solid solution crystals with $K^+$ ions to a depth of at least 10 microns and preferably 25 microns into the surface of the article. A bath of molten $KNO_3$ is the suggested source of $K^+$ ions at temperatures of 400°–600° C. and the eutectic 52% $KCl$-48% $K_2SO_4$ (by weight) as the source at 700°–800° C. The ion exchange must be undertaken with the glass-ceramic. When employed on the precursor glass and the glass then crystallized in situ, crazing invariably occurs.

A $Na^+$ ion for $Li^+$ ion exchange results in surface crazing whether conducted on the glass-ceramic article or on the precursor glass which is then crystallized to a glass-ceramic so, consequently, that exchange is inoperative to accomplish the desired purpose.

The practice of Ser. No. 451,282, the disclosure of which is incorporated herein by reference, does indeed successfully inhibit the surface roughening and crazing problems experienced by the transparent glass-ceramic containing β-quartz solid solution as the predominant crystal phase and having compositions encompassed within U.S. Pat. No. 3,148,994 and 4,018,612. A further problem was encountered, however, in the use of such glass-ceramics in coal and wood burning stove windows, viz., the presence of a dark, unsightly tint therein.

Chemical analyses of the glass-ceramic products detected the presence of very minor amounts of iron therein, up to about 0.05% by weight expressed in terms of $Fe_2O_3$. As can be appreciated, in large scale commercial production of glass articles, there is the desire to maintain the overall batch cost at a minimum. In the furtherance of that desire, naturally-occurring materials, with or without some beneficiation, will be utilized as batch ingredients whenever practical, rather than chemically pure compounds. Iron is a common impurity in such materials. For example, sand, which is conventionally used as the source of silica in glassmaking, contains iron as an impurity. And, as was observed above, $TiO_2$ alone or in combination with $ZrO_2$ is employed as a nucleating agent to insure the growth of very fine-grained, β-quartz solid solution crystals in the glass-ceramics disclosed in U.S. Pat. Nos. 3,148,994 and 4,018,612.

Although the mechanism operating is not fully understood, a reaction is believed to take place between the titanium and iron ions during the crystallization heat treatment, whereby the valence state of the titanium ions is reduced from $+4$ to a $+3$. The result of the reaction is the development of an unattractive gray-brown coloration in the glass-ceramic. Because of that reaction, it is apparent that the essentially total removal of iron from the batch ingredients will eliminate the discoloration problem. Nevertheless, as was explained above, to utilize only iron-free ingredients would significantly increase the cost of the parent glass batch. Consequently, the primary objective of the instant invention is to provide means for eliminating the development of an undesirable coloration during the crystallization heat treatment of glass-ceramics containing β-quartz solid solution as the predominant crystal phase, wherein $TiO_2$ is employed as a nucleating agent and iron is present as an impurity in amounts in excess of 0.01% by weight $Fe_2O_3$.

SUMMARY OF THE INVENTION

I have found that an essentially colorless, transparent glass-ceramic article containing β-quartz solid solution as the predominant crystal phase can be prepared from compositions disclosed in U.S. Pat. Nos. 3,148,994 and 4,018,612, wherein said compositions contain up to about 0.1% by weight iron, expressed in terms of $Fe_2O_3$, as an impurity by the essential absence of MgO from the compositions. Thus, such products can be produced from precursor glasses consisting essentially, expressed in terms of weight percent on the oxide basis, of the general composition ranges:

$SiO_2$—65–75,
$Li_2O$—1–4,
$Al_2O_3$—15–25,
ZnO—0.5–2,
$Na_2O$ and/or $K_2O$—0–2,
$TiO_2$—2–6,
$ZrO_2$—0–2,
BaO—0–2,
F—0–1.2
$Fe_2O_3$—$>0.01$ but $<0.1$.

Depending upon the base composition, the parent glass articles will be crystallized in situ via heat treating at temperatures between about 750°–950° C. Windows eminently suitable for use in coal and wood burning stoves can be prepared from those compositions utilizing the method of Ser. No. 451,282.

In summary, the method of the present invention consists essentially of the three general steps:

(a) a batch is melted for a glass consisting essentially, expressed in terms of weight percent on the oxide basis, of
$SiO_2$—65–75,
$Li_2O$—1–4,
$Al_2O_3$—15–25,
ZnO—0.5–2,
$Na_2O$ and/or $K_2O$—0–2,
$TiO_2$—2–6,
$ZrO_2$—0–2,
BaO—0–2.5,
F—0–1.2,
$Fe_2O_3$—$>0.01$ but $<0.1$.

(b) the melt is simultaneously cooled to a temperature at least below the transformation range thereof and a glass article of a desired configuration shaped therefrom; and subsequently (c) the glass article is exposed to a temperature between about 750°–950° C. for a period of time sufficient to crystallize the glass in situ to a glass-ceramic article containing β-quartz solid solution as the predominant crystal phase.

Where a stove window is the desired product, either of the two method embodiments of Ser. No. 451,282 may be applied.

For example:

(1) the glass article may be subjected to a $H^+$ ion for $Li^+$ ion exchange via immersion into a bath of a strong mineral acid operating at about 25°–320° C., and thereafter crystallized in situ at about 750°–950° C.; or (2) the glass-ceramic article may be subjected to a $K^+$ ion for $Li^+$ ion exchange via contact with a source of $K^+$ ions at about 400°–800° C., the source customarily consisting of a bath of a molten potassium salt.

RELATED APPLICATION

Ser. No. 451,282 filed concurrently herewith by me under the title *Transparent Glass-Ceramics Especially Suitable for Use as Stove Windows*.

Ser. No. 451,284 filed concurrently herewith by me under the title *Colored Transparent, Translucent, and Opaque Glass-Ceramics*.

DESCRIPTION OF PREFERRED EMBODIMENTS

Table I lists a group of exemplary compositions, analyzed in terms of weight percent on the oxide basis, illustrating the compositional parameters of the invention. The actual ingredients utilized in preparing the batch may comprise any materials, either the oxides or other compounds, which, when melted together, will be converted into the desired oxide in the proper proportions. Inasmuch as it is not known with which cation(s)

fluoride is combined and since the quantity thereof is quite small, it is simply reported as fluoride.

The batch ingredients were compounded, ballmilled together to assist in securing a homogeneous melt, the batches deposited into platinum crucibles, lids placed upon the crucibles, and the crucibles introduced into a furnace operating at about 1550°–1600° C. The batches were melted for about 16 hours with stirring, canes having a diameter of about 0.25" were hand-drawn from each melt and the remainder of each melt was poured into a steel mold to form a glass slab having dimensions of about 6"×6"×0.5". The slabs were immediately transferred to an annealer operating at about 650°–700° C. After annealing, the slabs were cut, ground, and polished to form squares with dimensions of about 2.5"×2.5"×0.2".

$As_2O_3$ performs its conventional function as a fining agent and the $Fe_2O_3$ level is the result of impurities in the batch materials.

TABLE

|  | 1 | 2 | 3 |
| --- | --- | --- | --- |
| $SiO_2$ | 67.4 | 68.5 | 66.6 |
| $Al_2O_3$ | 20.4 | 19.0 | 20.5 |
| $Li_2O$ | 3.5 | 2.8 | 3.7 |
| $Na_2O$ | 0.2 | 0.2 | 0.4 |
| $K_2O$ | 0.2 | 0.2 | 0.5 |
| ZnO | 0.2 | 0.1 | 1.0 |
| BaO | — | 0.9 | 2.0 |
| MgO | 1.6 | 2.2 | — |
| $TiO_2$ | 4.8 | 2.9 | 2.6 |
| $ZrO_2$ | — | 1.5 | 1.6 |
| F | 0.2 | — | — |
| $As_2O_3$ | 0.4 | 0.7 | 0.5 |
| $Fe_2O_3$ | 0.03 | 0.028 | 0.05 |

Squares of Example 1 were crystallized in situ by heating at a rate of about 100° C./hour to 750° C., holding at that temperature for about one hour to induce nucleation, raising the temperature at about 100° C./hour to 825° C., maintaining that temperature for about two hours to cause the growth of crystals on the nuclei, and then cooling to room temperature at furnace rate. X-ray diffraction analyses identified β-quartz solid solutions as the predominant crystal phase accompanied with a minor amount of rutile. Although the squares were transparent, each exhibited a gray-brown appearance.

Squares of Example 2 were crystallized in situ by heating at a rate of about 100° C./hour to 780° C., holding at that temperature for about two hours to induce nucleation, raising the temperature at a rate of about 100° C./hour to 900° C., maintaining that temperature for about one hour to cause the growth of crystals on the nuclei, and then cooling to room temperature at furnace rate. X-ray diffraction analyses identified β-quartz solid solution as the predominant crystal phase with a very minor amount of rutile. The squares were transparent but each displayed a amber-brown tint.

Squares of Example 3 were crystallized in situ by heating at a rate of about 150° C./hour to 780° C., holding at that temperature for about one hour to induce nucleation, raising the temperature at a rate of about 150° C./hour to 900° C., maintaining that temperature for about one hour to cause the growth of crystals on the nuclei, and then cooling to room temperature at furnace rate. X-ray diffraction analyses identified β-quartz solid solution as the predominant crystal phase with a very minor amount of rutile. Each of the squares was transparent and essentially colorless.

A two-step heat treatment schedule such as those utilized above is not mandatory but, as is well-recognized in the glass-ceramic art, the use of a two-step crystallization heat treatment frequently yields a product of more uniformly fine-grained crystallization.

Crystallized squares of Example 3 were immersed into a bath of molten $KNO_3$ operating at about 530° C. Essentially no crazing or surface roughening was observed after an immersion of 24 hours, and scanning electron microprobe analysis indicated that the $K^+$ ion for $Li^+$ ion exchange continued to a depth in the surface in excess of 0.001".

As is explained in Ser. No. 451,282, a laboratory oven was devised to simulate the temperatures and atmospheres encountered in coal and wood burning stoves. Thus, an atmosphere consisting of air+CO, $CO_2$, S, $SO_2$, $SO_3$, and $H_2SO_4$ vapors was continuously moved through the oven to approximate the movement of gases in a stove and the oven was operated in the range of 200°–600° C. as measured at various positions on the oven walls.

The squares subjected to the above $K^+$ ion for $Li^+$ ion exchange were rinsed in tap water to remove the salt clinging thereto, introduced into the laboratory oven, and then held therewithin for over 1000 hours, a period of time estimated to correspond to about 10 years of actual service in a coal and/or wood burning stove. Virtually no crazing or surface roughening could be discerned and the squares remained essentially colorless.

Crystallized squares of Example 3 were also immersed into a bath of molten 52% by weight KCl-48% by weight $K_2SO_4$ (the eutectic mixture of those two compounds) operating at about 700° C. for a period of about one hour, the squares rinsed in tap water to remove the salt clinging thereto, introduced into the laboratory oven, and then maintained therewithin for 800 hours, a period of time estimated to correspond to about eight years of service life in a coal and/or wood burning stove. Virtually no crazing or roughening of the surface could be detected and the squares remained substantially colorless.

Squares of the precursor glass of Example 3 were immersed into a bath of concentrated $H_2SO_4$ operating at about 270° C. After about eight hours the squares were removed from the bath, rinsed with tap water to eliminate any adhering $H_2SO_4$, and dried. Essentially no crazing or surface roughening was observed. Thereafter, the squares were crystallized in situ utilizing the heat treating schedule recited above. As is explained in Ser. No. 451,282, the glass article will be heated relatively slowly, i.e., not more than at a rate of about 200° C./hour to the crystallization temperature, to insure the essentially complete, non-destructive removal of $H_2O$ from the glass structure.

The crystallized squares resisted crazing and surface roughening when exposed to the atmosphere of the abovedescribed laboratory oven for about 100 hours. That resistance is a significant improvement over the untreated products (substantial crazing and surface roughening after 24 hours' exposure), but is about an order of magnitude less than exhibited by articles subjected to the $K^+$ ion for $Li^+$ ion exchange.

Example 3 constitutes the best mode of the inventive compositions.

I claim:

1. A transparent, essentially colorless glass-ceramic article containing β-quartz solid solution as the predominant crystal plane having a composition wherein MgO is essentially absent and consisting essentially, expressed in terms of weight percent on the oxide basis, of SiO$_2$—65-75,
Li$_2$O—1-4,
Al$_2$O$_3$—15-25,
ZnO—0.5-2,
Na$_2$O and/or K$_2$O—0-2,
TiO$_2$—2-6,
ZrO$_2$—0-2,
BaO—0-2.5,
F—0-1.2,
Fe$_2$O$_3$—>0.01-<0.1.

* * * * *